(No Model.)

A. C. LIPPITT.
APPARATUS FOR TREATING AND REDUCING ORES, &c.

No. 259,769. Patented June 20, 1882.

Attest:
Sidney P. Hollingsworth
Walter S. Dodge

Inventor:
Andrew C. Lippitt
by Dodge Son,
Attys.

UNITED STATES PATENT OFFICE.

ANDREW C. LIPPITT, OF NEW LONDON, CONNECTICUT.

APPARATUS FOR TREATING AND REDUCING ORES, &c.

SPECIFICATION forming part of Letters Patent No. 259,769, dated June 20, 1882.

Application filed February 4, 1882. (No model.)

*To all whom it may concern:*

Be it known that I, ANDREW C. LIPPITT, of New London, in the county of New London and State of Connecticut, have invented certain Improvements in Apparatus for Treating and Reducing Ores and other Substances, of which the following is a specification.

My invention relates to apparatus for treating ores and other substances; and it consists primarily in a pan or vessel sustained in an inclined position by a central bearing, and a circumferential track or support, upon which the pan is caused to travel.

The invention further consists in a peculiar construction of the pan or vessel and its support and mechanism for causing it to travel or roll about its central support, as hereinafter explained.

Figure 1:
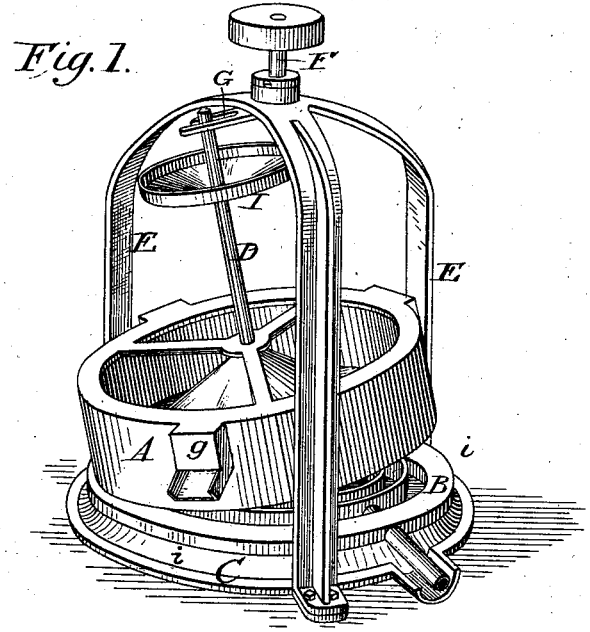
Figure 2:
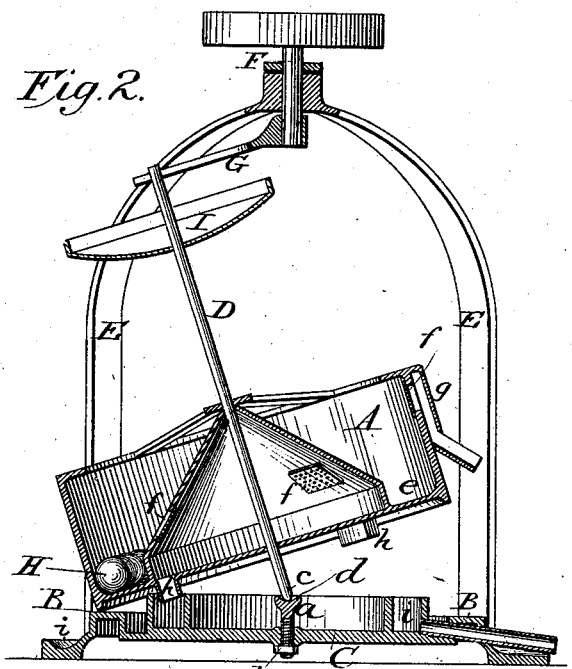

In the accompanying drawings, Figure 1 is a perspective view of my improved apparatus, and Fig. 2 a vertical section of the same.

The purpose of my invention is to produce a cheap and efficient apparatus for reducing, mixing, or separating various substances, or for amalgamating metals, which shall be durable and easy of operation; and to this end I adopt such a construction that all motions produced are continuous rolling motions, balls or spherical weights being employed within the pan or tub to assist in the reduction or treatment of the substances placed therein.

Referring to the drawings, A represents a vessel of circular form, sustained at its center upon a point or bearing, *a*, and resting at its circumference upon a track or bed, B, somewhat lower than the center of the vessel, so that the pan or vessel is caused to assume a slanting or inclined position, and consequently to bear upon the track at a single point only in its circumference. In order to permit the angle of inclination to be varied as circumstances may require, the central support, *a*, is made vertically adjustable, as shown in Fig. 2, being threaded to screw into the base C and furnished with a jam-nut, *b*, to prevent its accidental turning. In practice the central bearing is formed as shown in Fig. 2—that is to say, the pan or vessel is provided with a downwardly-projecting stud or point, *c*, which enters a socket *d*, which, being in the form of a cup, serves to hold a supply of oil, and thus to keep the bearing well lubricated. If preferred, however, the arrangement may be reversed. The pan or vessel is furnished with a central shaft, D, extending some distance upward and perpendicular to the top and bottom of said vessel, hence inclined from a true vertical position when the pan is mounted, as above explained.

E represents the frame or tripod, carrying at its top a short vertical shaft, F, which may be furnished with a band-pulley or driving-wheel, a sweep, or other device by or through which motion may be imparted to it, and also furnished with a radial arm, G, perforated or slotted to receive the upper end of the shaft D. Under this construction and arrangement of parts it will be seen that the rotation of the shaft F will cause the arm G to travel around in a horizontal plane, carrying shaft D with it and causing the pan to roll upon its lower outer edge on the track B.

The construction of the pan A will be clearly understood upon referring to Fig. 2, where it will be seen to consist of a cylindrical vessel with perpendicular, or substantially perpendicular, outer walls, an inwardly-projecting flange, an annular channel, *e*, the corners of which are rounded or curved, and the sides approximately parallel to the outer walls, and a central raised portion with a conical or sloping top, the outer walls and the conical top of the central portion being each provided with openings *f*, furnished with wire-gauze, perforated metal, or other screening-cover, as shown.

Spouts *g h* extend from the openings *f* downward nearly to and below the bottom of the vessel, as shown, and beneath the spouts are arranged circular troughs *i* to receive the outflow from the spouts.

The apparatus being thus constructed, its operation is as follows: The vessel is supplied with a proper quantity of the material to be treated, and if reduction is desired a number of spherical weights or crushers, H, are likewise placed therein and motion imparted to the vessel through shaft F, as above explained. This motion causes the material and the spherical pounders or weights to travel constantly around in the channel *e* in consequence of their tendency to find the lowest point and the constant changing of said point, thus causing every particle of the material to be thoroughly treated and acted upon.

In the treatment of ores, metallic sands, &c., water will be placed in or allowed to flow into the vessel, and as the lighter matters rise to the surface thereof they will be discharged with the water through the openings $f$, to which the water is raised by the centrifugal force due to rotation.

For amalgamating, mercury is introduced with the ore, sand, or other material, while for sifting the use of liquids of any kind may be dispensed with in many cases, and the pounders or weights may be omitted, the screening or sifting material being in such case carried entirely or nearly all the way around, and the matter to be sifted being thrown through the same by centrifugal force.

A cup or vessel, I, is secured upon the shaft D above the pan or vessel A to catch any matters which might otherwise fall into the pan from above.

The construction of the frame is of no material importance, but may be varied both as to form and material.

The pan or vessel may be of wood or metal, or partially of each, and of such size as circumstances may require or permit.

It will be seen that in consequence of the rolling action employed throughout the apparatus the wear and tear will be very slight and the power required to operate the apparatus will be very small, depending of course upon the diameter of the vessel, its inclination, contents, &c.

It is apparent that the shaft D may be extended downward through an eye or hole and the power applied below the bed; or that a follower may be arranged to travel around the track, and by acting on the under side of the vessel produce the rolling or traveling motion thereof; or that the upright frame may be omitted and the driving-shaft mounted in bearings secured to the roof or ceiling overhead. It is likewise obvious that the openings $f$ may be continuous, or extend entirely around the vessel, and that in other minor details the apparatus may be modified, as rendered necessary by the requirements of particular cases.

In speaking of the pan or vessel as rolling about its central support, I do not mean to be understood as saying that the vessel revolves or rotates about its axis, but that it has a wabbling motion, or tips or rocks upon its central support and circumferential bearing, the latter constantly changing by reason of the rocking or tipping motion, but there being no horizontal travel or movement of the vessel relatively to the track or bed, the material within the vessel being, however, caused to travel constantly around within the vessel by the constantly-changing inclination of said vessel.

I am aware that it is not new to mount a pan or vessel in an inclined position, to place rolling weights or balls therein, and to give to the shaft or central support of the pan or vessel an orbital movement relatively to the vertical center of the pan.

I am further aware that a pan or vessel has been hung from a central support, carrying at one side an arm to depress the pan and to cause it to approach or bear upon a bed beneath, the arm overcoming the weight of a rolling grinder carried around by the driving-shaft and held by a yoke at the highest side of the pan; but I am not aware that such a pan or vessel has been sustained in the manner herein set forth and shown—that is to say, by a central support and a circumferential track, which latter receives the weight, or the principal weight, of the pan, leaving the operating devices absolutely free therefrom.

By my plan the operating mechanism is relieved of the great strains to which under other constructions it is subjected, and may therefore be made very light. Far less power will also serve to operate the machine under this construction than when made as above mentioned.

Having thus described my invention, what I claim is—

1. In an apparatus for treating ores and other substances substantially as described, the combination of a pan or vessel supported at its center, and a track or bed located in a plane below the central support and supporting the pan at its circumference, whereby the weight of the vessel causes it to maintain an inclined position and to rest upon the track.

2. In an apparatus for treating ores and other substances, the combination of a pan or vessel, a raised central support, and a circumferential track, arranged as shown and described, whereby the operating mechanism is entirely relieved of the weight of the pan.

3. In combination with the base, having the central support and track B, the pan A, mounted thereon, and adapted to roll about the central support and to rest continuously upon the track, substantially as set forth.

4. In combination with the pan or vessel A and its central support, the sustaining-track B at its circumference, and means, substantially such as shown and described, for causing the pan to roll about the central support.

5. In combination with the pan supported in an inclined position, as explained, by a central support and a circumferential track, and provided with a central shaft, an arm arranged, substantially as shown, to revolve in a horizontal plane and to act against the shaft, whereby the pan is caused to roll about its central support upon the track or bed.

6. In combination with the track B and pan A, the adjustable central support, $a$, substantially as shown and described.

7. In combination with the pan or vessel A, constructed substantially as shown and described, the base provided with troughs $i$, as and for the purpose explained.

8. The pan or vessel A, supported and driven as herein described and shown and provided with outlets $f$, as and for the purpose specified.

9. The pan or vessel A, mounted and driven as explained and shown, provided with screening-openings $f$ and spouts $g\ h$, as and for the purpose explained.

10. The herein-described apparatus for treating and reducing ores and other substances, consisting of the pan or vessel A, supported by the central support and circumferential track, and operated substantially as described, and the rolling pounders and weights H, placed within said vessel, and operating substantially as explained.

11. The herein-described apparatus, consisting of the pan or vessel, provided with shaft D, central support, $a$, track B, arm G, loosely connected with shaft D, and shaft F, provided with pulley or sweep, as explained.

ANDREW C. LIPPITT.

Witnesses:
ANDREW C. LIPPITT, Jr.,
GIDEON F. RAYMOND.